Jan. 20, 1931.                J. J. JENSEN                1,789,407
                          DUPLEX VIBRATING TABLE
                           Filed Aug. 19, 1929
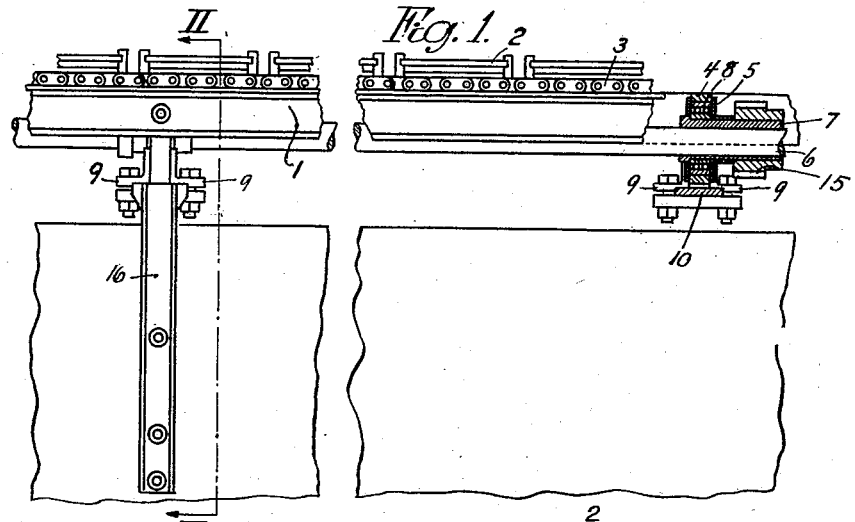
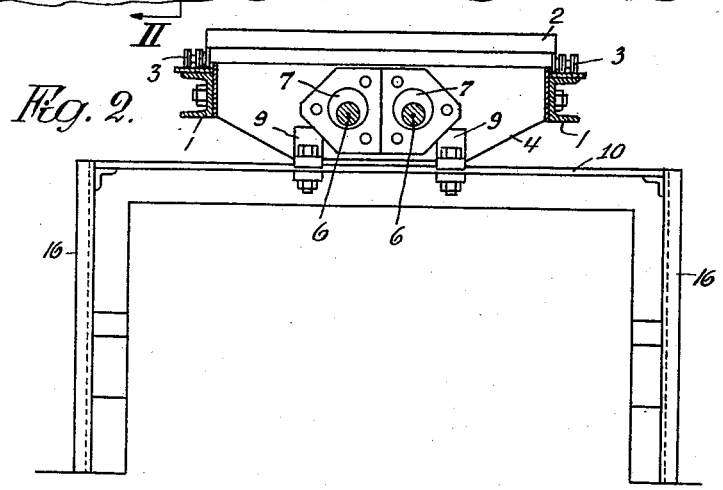
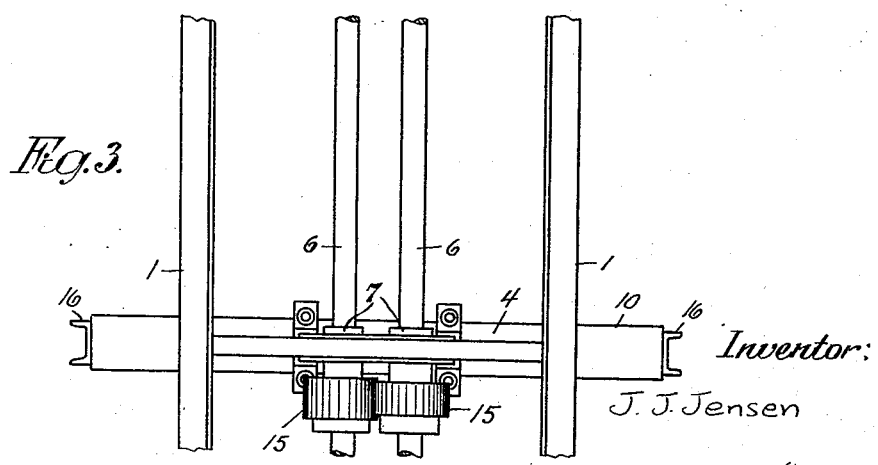
Inventor:
J. J. Jensen
By: Marks & Clerk
    Attys.

Patented Jan. 20, 1931

1,789,407

UNITED STATES PATENT OFFICE

JENS JOHANNES JENSEN, OF COPENHAGEN, DENMARK, ASSIGNOR TO MESSRS. BOG-GILD & JACOBSEN, OF COPENHAGEN, DENMARK

DUPLEX VIBRATING TABLE

Application filed August 19, 1929, Serial No. 387,034, and in Germany September 7, 1928.

The invention relates to a duplex vibrating table, i. e. a device for producing a suitably intense vibratory motion.

Table devices are known by which the vibratory motion is produced in that the table device supported by horizontal and vertical springs is set into motion by means of an eccentric shaft. This shaft, however, will produce vibrations radiating radially in all directions, whereby under certain circumstances an unnecessarily intense shaking will be effected.

Instead of using one eccentric shaft for producing the vibratory motion the present invention employs two or more eccentric shafts arranged in pairs and rotating in opposite directions. Hereby a portion of the vibratory motions produced by the eccentricity of the shaft will be compensated, in such a manner that for instance in the case of horizontal juxtaposed shafts only vertical oscillations will occur.

The drawing shows by way of example one construction of the novel device,

Fig. 1 showing a portion of a vibrating table in side elevation,

Fig. 2 a section along the line II—II in Fig. 1, and

Fig. 3 the same part in top view.

On the drawing 1 is a rectangular frame on top of which the moulds 2 attached to conveyor chains 3 may travel while being shaken as disclosed in Patent No. 1,645,505. The vibrating frame 1 has transverse pieces 4 fitted with supporting bearings for two eccentrically bored bushings 7 for shafts 6, 6, the said bushings being interconnected by means of spur gears 15. The bushings 7 are journalled in ball bearings 8. By means of brackets 9 the said transverses 4 are bolted on to plate springs 10 attached to a rigid frame 16. By means of suitable devices not shown on the drawing the bushings 7, and thereby the shafts 6 may be caused to rotate rapidly, and as the shafts rotate in opposite directions they will be able to impart to the frame 1 a vibratory motion in vertical direction, while the vibrations in horizontal direction will be compensated. The transverse pieces 4 being bolted to the elastic springs 10 attached to the rigid frame 16 it will be evident that the parts subjected to vibration in the vertical direction are the bushings 7, the transverse pieces 4, the brackets 9, the springs 10, the frame 1, the chains 3 and the moulds 2.

Referring to the position of the bushings 7 in Fig. 2 it will be noted that the prominent portions of both of them are located above the shafts 6 which latter occupy their lower position, and as the two bushings revolve together at the same rate but in opposite directions it is evident that the prominent portions thereof simultaneously arrive at their upper and lower points, whereas in passing through the intermediate stages of their rotary motion, the eccentrics move in opposition to each other, that is to say, at one stage of their revolution they are widely separated, being disposed outwardly of the shafts 6, and at another stage of their rotary movement they are disposed adjacent each other with the shafts 6 lying outwardly or widely spaced. Thus, during the rotary movement of the eccentric bushings a shaking movement or impulse is imparted to the table at the moments when the prominent parts of the eccentrics simultaneously arrive at their upper and lower points while during the movement of the eccentrics through the intermediate stages of their rotary movement, the effect of one eccentric is offset or neutralized by the other, and therefore no vibratory movement of the table in the horizontal direction occurs. Thus, the whole frame will have only a vertical movement which is accommodated by the resilient springs 10. It is further evident that during the rotary movement of the two eccentric bushings, the shafts 6 to which said eccentrics are affixed are caused to move bodily through a path the axis of which coincides with the axis of the external surface of the eccentric bushings 7.

By disposing the shafts below one another the table may be given a vibratory motion in horizontal direction. A still greater number of eccentric shafts may of course also be used, for instance four or six.

Having now described my invention, what I claim as new and desire to secure by Letters Patent is:—

In combination, a vibrating frame including cross pieces, eccentrically bored bushings, shafts mounted in the eccentric bores of the bushings, bearing for said bushings fitted in said cross pieces, a pair of intermeshing gears adapted to revolve uniformly in opposite directions connecting said bushings.

In testimony whereof I affix my signature.

JENS JOHANNES JENSEN.